United States Patent [19]

Kawaguchi et al.

[11] Patent Number: 4,552,373
[45] Date of Patent: Nov. 12, 1985

[54] FRONT WHEEL SUSPENSION SYSTEM FOR MOTORCYCLE OR THE LIKE

[75] Inventors: Takeshi Kawaguchi, Saitama; Yoshimi Ishikawa, Tokyo; Taizo Oonishi, Saitama, all of Japan

[73] Assignee: Honda Giken Kogyo Kabushiki Kaisha, Tokyo, Japan

[21] Appl. No.: 595,635

[22] Filed: Mar. 30, 1984

Related U.S. Application Data

[63] Continuation of Ser. No. 418,664, Sep. 16, 1982, abandoned.

[30] Foreign Application Priority Data

Sep. 19, 1981 [JP] Japan ................................. 56-148030

[51] Int. Cl.$^4$ ..................... B60G 17/08; B62K 25/08
[52] U.S. Cl. ..................... 280/276; 180/219; 188/272; 188/287; 188/318; 280/703
[58] Field of Search ............. 280/276, 275, 283, 703, 280/227; 267/34; 188/313, 272, 322.1 J, 299, 318

[56] References Cited

U.S. PATENT DOCUMENTS

| | | | |
|---|---|---|---|
| 2,342,381 | 2/1944 | Thornhill | 267/34 |
| 3,584,712 | 6/1971 | Dickinson | 188/318 X |
| 3,774,935 | 11/1973 | Aldrich | 280/703 |
| 3,989,261 | 11/1976 | Kawaguchi | 280/276 |
| 4,145,067 | 3/1979 | Ceriani | 280/276 |
| 4,295,658 | 10/1981 | Kashima | 280/276 |
| 4,353,570 | 10/1982 | Kanazawa | 280/275 |
| 4,392,664 | 7/1983 | Tsuchiya et al. | 280/276 |

FOREIGN PATENT DOCUMENTS

| | | | |
|---|---|---|---|
| 1586788 | 2/1970 | France | |
| 2073680 | 10/1981 | United Kingdom | 280/703 |

OTHER PUBLICATIONS

Japanese Pat. Publication No. 51146/1979, published 4/24/79.
Japanese Pat. Publication No. 29059/1977, published 7/30/77.

Primary Examiner—Joseph F. Peters, Jr
Assistant Examiner—Mitchell J. Hill
Attorney, Agent, or Firm—Lyon & Lyon

[57] ABSTRACT

An anti-dive device for the telescopic front fork assembly of a motorcycle includes a contraction regulator mounted on the forward face of the bottom case. The bottom case carries the axle for the front wheel. Braking torque causes the movement of a member which movement is reflected through a bell crank assembly to close the valve in a passage connecting the two oil chambers in the front fork assembly. A bypass passage has an orifice member which may be moved to vary the size of a restriction in the bypass passage.

7 Claims, 9 Drawing Figures

FRONT WHEEL SUSPENSION SYSTEM FOR MOTORCYCLE OR THE LIKE

This application is a continuation of application Ser. No. 418,664 filed Sept. 16, 1982, now abandoned.

This invention relates to a front wheel suspension system for the telescopic front fork of a motorcycle or the like to prevent it from diving when the front wheel brake is applied. Typically, the front fork includes a bottom case which carries the front wheel axle and which is fixed to an outer tube which slidably receives a fork pipe in telescopic relation. In such conventional construction, the front fork is contracted when the front wheel brake is applied. This diving action is caused by the shift of the center of gravity, and inertia, and the front fork is fully contracted during an abrupt braking operation.

In order to prevent the front portion of the motorcycle body fron diving when the front wheel is braked, there have been proposed in the prior art various types of anti-dive systems, which operate by detecting the presence of braking torque in terms of the shift of a member which receives the reaction to the braking force. Such shift automatically blocks the passage of oil between chambers in the telescopic front fork.

The present invention relates to improvements in a front wheel suspension system of a motorcycle or the like of the type described, and has as an important object provision of a front wheel suspension system which enjoys a high degree of freedom for setting the operation timing of a contraction regulator, and which has a simple and compact construction.

Other and more detailed objects and advantages will appear hereinafter.

In the drawings:

FIG. 1 is a sectional side elevation partly broken away, showing a preferred embodiment of this invention.

FIG. 2 constitutes an enlargement of a portion of FIG. 1.

Figure 1:
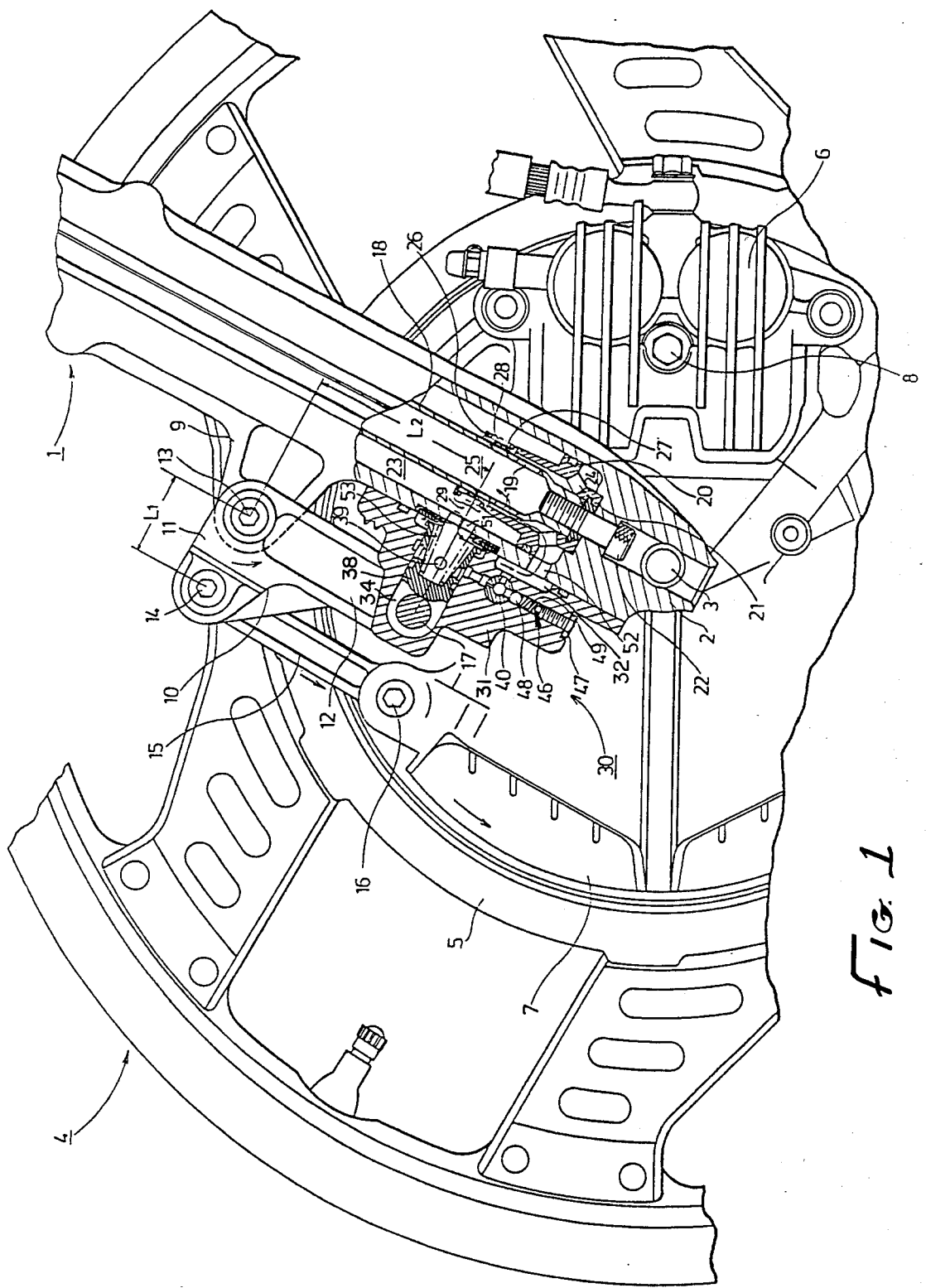
Figure 2:
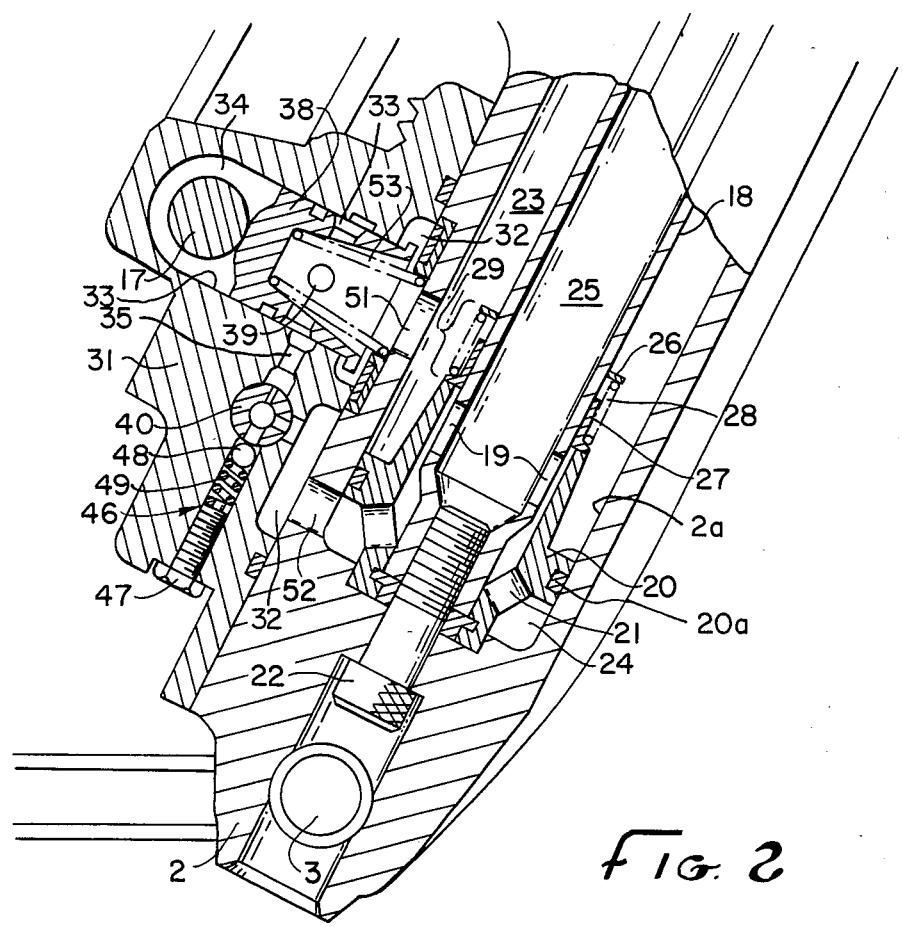
Figure 3:
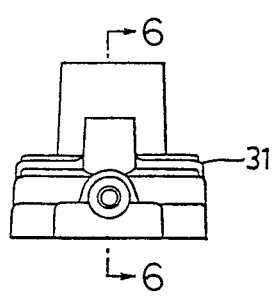
FIG. 3 is an end view of a casing for the contraction regulator shown in FIGS. 1 and 2.
Figure 4:
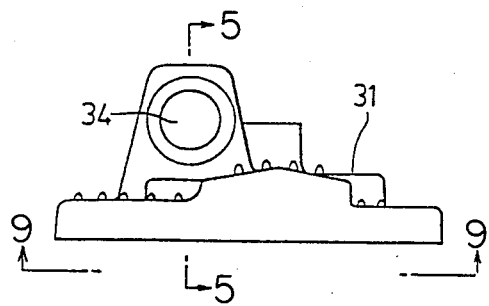
FIG. 4 is a side elevation thereof.
Figure 5:
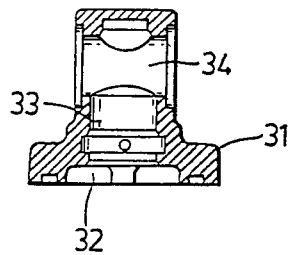
FIG. 5 is a sectional view taken substantially on the lines 5—5 as shown in FIG. 4.
Figure 6:
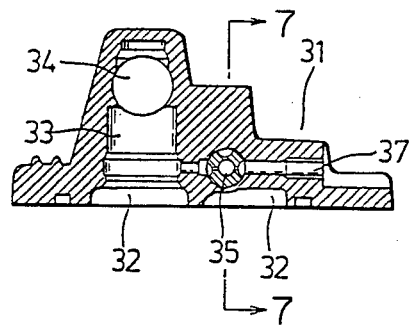
FIG. 6 is a sectional view taken substantially on the lines 6—6 as shown on FIG. 3.
Figure 7:
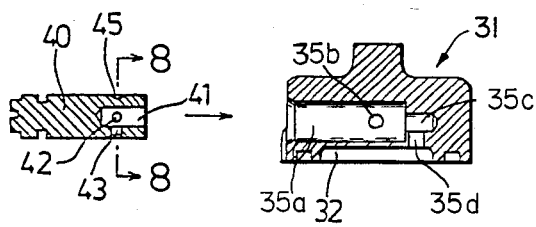
FIG. 7 is a sectional view taken substantially on the lines 7—7 as shown on FIG. 6.
Figure 8:
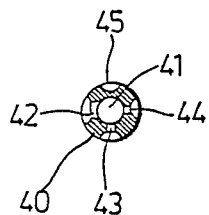
FIG. 8 is a sectional detail taken substantially on the lines 8—8 as shown on FIG. 7.
Figure 9:
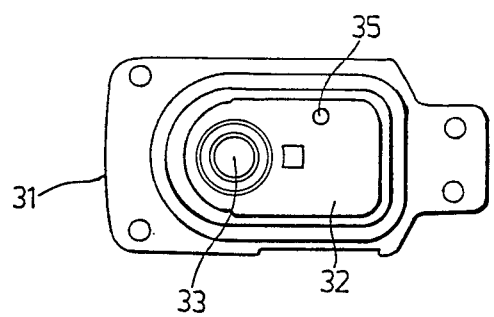
FIG. 9 is a bottom plan view taken substantially in the direction of the lines 9—9 as shown on FIG. 4.

Referring to the drawings, the telescopic front fork 1 of a motorcycle is constructed to include a bottom case 2 in which a fork pipe, not shown, is slidably mounted for telescopic movement. In the bottom portion of the bottom case 2 there is internally mounted a front wheel axle 3 on which the motorcycle front wheel 4 is rotatably mounted by means of bearings, not shown. On both sides of the wheel hub 5 of the front wheel 4 there are integrally mounted two annular brake disks, not shown, and a brake caliper 6 is positioned to straddle the radially inner portions of such annular brake disks. The brake caliper 6 is detachably mounted by means of a bolt 8 on a caliper supporting bracket 7 which acts as a torque receiving means.

A projection 9 formed integrally with the bottom case 2 protrudes from the forward side thereof and carries a pivot pin 13 which supports the L-shaped bell crank 10. The bell crank 10 has a short arm 11 of effective length $L_1$ and a long arm 12 of effective length $L_2$. A tension rod 15 is connected by pivot pin 14 to the short arm 11 and is connected at its other end by pivot pin 16 to the caliper supporting bracket 7. The long arm 12 is bifurcated to accept a portion of a casing 31 and carries a pin 17 fixed to the leading ends of the bifurcated portion. The pin 17 is loosely received in an opening 34 in the casing 31. The casing 31 is fixed to the forward lower portion of the bottom case 2.

The magnitude of a force W to be exerted upon the leading ends of the long arm 12 of the L-shaped bell crank 10 is reduced relative to a force F to be exerted upon the tension rod 15 by the caliper supporting bracket, and is expressed by the following equation:

$$W = (L_1/L_2) \times F$$

The lower end of the seat pipe 18 together with the partition fixture 20 is fixed to the lower end of the bottom case 2 by means of a bolt 22. The fixture 20 is sealed at 20a with respect to the bore 2a of the bottom case 2. In accordance with conventional practice, a piston, not shown, is integrally formed at the upper end of the seat pipe 18 and is hermetically sealed for sliding movement within the fork pipe. A conventional compression coil spring, not shown, is positioned so that the telescopic front fork can be held in its extended state by spring force.

An oil pressure accumulating chamber 23 is defined in the annular space between the bore 2a of the bottom case 2 and the outer surface of the seat pipe 18 and partition fixture 20. In turn, the chamber 24 is connected through both an opening 21 formed in the partition fixture 20 and an opening 19 formed in the seat pipe 18. A reservoir chamber 25 is defined by the seat pipe 18 and the piston, not shown, at the upper end of the seat pipe. The oil pressure, which is built up in the oil pressure accumulating chamber 23 during the contraction stroke of the telescopic front fork 1, is attenuated by the drag in the passage of the contraction regulator 30. The oil under pressure passes through the communication chamber 24 into the reservoir chamber 25 so that the shocks and vibrations generated as a result of the motion of the motorcycle along a roadbed are absorbed by the co-actions of the spring force of the compression coil spring, not shown, and the passage drag of the contraction regulator 30.

To the upper end of the partition fixture 20, moreover, there is attached a check valve 29 which is constructed to include a seat 26 fitted on the upper end of the seat pipe 18, a sliding member 27, and a compression coil spring 28 between the seat 26 and the sliding member 27. At the end of the extension stroke of the telescopic front fork 1, the working oil in the reservoir chamber 25 is directly recirculated in a low pressure drag state into the oil pressure accumulating chamber 23 by way of the check valve 29.

The contraction regulator 30 which is located below the integral projection 9 and fixed to the front portion of the bottom case 2 includes a casing 31, and an anti-dive piston 38 which is fitted hermetically and slidably in a cylinder chamber 33 of the casing 31 to form an anti-dive piston valve. The contraction regulator 30 also includes a rotary type adjusting orifice element 40 which is fitted in a bypass passage 35 comprising parts 35a, b, c, d having an end communicating with an opening 39 formed in the piston 38. An adjustment mechanism 46 fixes the angular position of the orifice member 40.

The casing 31 is provided with a main passage 32 to establish communication between the openings 51 and 52 in the bottom case 2. The cylinder chamber 33 communicates through the opening 51 with the oil pressure accumulating chamber 23. The bypass passage 35 provides communication between the opening 39 and the main passage 32. The adjusting orifice member 40 has a center passage 41 communicating with radial ports 42, 43 and 44 of different sizes. A groove 45 has no communication with the same center passage 41. The adjusting bolt 47 acts through spring 49 and against ball 48 to cause the ball 48 partially to enter one of the ports or the groove 45, to hold the orifice member 40 in adjusted position.

Assuming that the front brake caliper 6 is not operated and therefore no braking force is applied to the front wheel 4: Upward shocks applied to the front wheel 4 then cause oil under pressure in the accumulating chamber 23 to flow into the reservoir chamber 25 by way of the opening 51, main passage 32, opening 52, communication chamber 24, and the openings 21 and 19. As a result, the upward shocks exerted upon the front wheel 4 are absorbed by the co-actions of the spring force of the compression coil spring, not shown, which is positioned between the fork pipe and the upper end piston of the seat pipe 18, and by the drag of the tortuous oil passage thus described.

In case a downward force is exerted upon the front wheel 4, when there is no braking force applied to the front wheel 4, the anti-dive piston 38 is moved away from the bottom case 2 by the force of the coil spring 53, so that the working oil under pressure in the reservoir chamber 25 is introduced from the opening 19 via the check valve 29 into the oil pressure accumulating chamber 23. Since the passage drag is low in the course of this flow, the telescopic front fork 1 can be abruptly elongated.

In a state in which the front brake caliper 6 is actuated so that braking force is applied to the front wheel 4, a force for effecting a counter-clockwise rotation, as viewed in FIG. 1, is exerted upon the caliper supporting bracket 7, thereby to draw the tension rod 15 downward. In response to this action, the L-shaped bell crank 10 is rocked counter-clockwise about the pin 13, thereby to bring the anti-dive piston 38 into abutment contact with the bottom case 2 through the pin 17 against the spring force of the coil spring 53, so that the main passage 32 is blocked. In this particular state, by the force which is generated to compress the front fork 1 by the shift of the center of gravity of a motorcycle and rider and the inertial force during the braking operation, the working oil under pressure established in the oil pressure accumulating chamber 23 is carried into the reservoir chamber 25 by way of the opening 51, the piston opening 39, the bypass passage 35, one of the communication passages 42, 43 and 44, the center passage 41, the main passage 32, the opening 52, the communication chamber 24, and the openings 21 and 19. As a result, a higher passage drag than that developed during the operation other than the braking operation is established to prevent the telescopic front fork 1 from diving.

In case upward shocks are applied to the front wheel 4 when the front fork caliper 6 is in operation to apply braking force to the front wheel 4, the anti-dive piston 38 moves back and forth in the chamber 33 to follow the movements of the pin 17, so that the main passage 32 becomes open. As a result, the upward shocks are absorbed in a similar manner to those of the usual running operations.

Furthermore, by suitably varying the lengths of the shorter and longer arms 11 and 12 of the L-shaped bell crank 10, thereby to set their ratio $L_1/L_2$ at a desired value, the force to be exerted upon the anti-dive piston 38 can be readily selected. Furthermore, by turning the rotary type adjusting orifice member 40 at a suitable interval of 90°, one of the ports 42, 43 and 44 or the groove 45 may be brought into a position to face the bypass passage 35. Any of the passage drags of four steps can be selectively set so that the desired anti-dive characteristics can be established.

As described above, the present invention has been applied to a motorcycle, but it can also be applied to an automatic tricycle which has one front wheel and two rear wheels.

According to the present invention, the valve device, which is made operative to block the main communication passage between the fork pipe and bottom case, can be disposed near the bottom of the bottom case independently of the mounting position of the brake caliper, so that the passage of the front fork actuating oil can be shortened to reduce the passage drag.

Having fully described our invention, it is to be understood that we are not to be limited to the details herein set forth but that our invention is of the full scope of the appended claims.

We claim:

1. In an anti-dive device for the telescopic front fork assembly of a motorcycle or the like, the telescopic front fork assembly including a bottom case having a forward wall fixed to an outer tube telescopically receiving a fork pipe, the bottom case carrying an axle for the front wheel, the improvement comprising, in combination: a contraction regulator fixed on the forward wall and having a main oil passage with a main valve therein, two spaced openings in said forward wall communicating with said main valve in said main oil passage, and a bell crank having a short arm moving in response to braking torque applied to the front wheel and having a long arm operable to close said main valve.

2. In an anti-dive device for the telescopic front fork assembly of a motorcycle or the like, and including a caliper support bracket and a bottom case having a forward wall fixed to an outer tube, the bottom case carrying an axle for the front wheel, the improvement comprising, in combination: a contraction regulator fixed on the forward wall and having a main oil passage, two spaced openings in said forward wall communicating with said main oil passage formed in the contraction regulator, a valve in said passage, a bell crank pivotally mounted to the bottom case and having a first arm coupled with said valve and a second arm coupled with the caliper support bracket, the caliper support bracket being able to move relative to the case in response to braking torque applied to the front wheel.

3. In the anti-dive device of claim 2 wherein said bell crank is adjacent the forward wall of the bottom case.

4. In the anti-dive device of claim 2, the improvement further comprising a tension link coupled between said second arm and the caliper support bracket.

5. In the anti-dive device of claim 4, said bell crank and said tension member being located adjacent the forward wall of the bottom case.

6. In the anti-dive device of claim 2 said first arm being longer than said second arm of said caliper.

7. In an anti-dive device for a telescopic front fork assembly of a motorcycle including a caliper support bracket and a bottom case fixed to an outer tube, the bottom case carrying an axle for a front wheel and having a forward wall and a rear wall, the improvement comprising, in combination: a contraction regulator fixed on the forward wall, and having a main oil passage, two spaced openings formed in the forward wall communicating with the main oil passage formed in the contraction regulator, a valve means located in said contraction regulator to close said main oil passage upon application of a braking torque, a caliper mounted on the caliper support bracket at the rear wall, a valve actuating means mounted on the forward wall and operatively coupled at a first end with said valve means and at a second end with the caliper support bracket, the caliper support bracket adapted to move through movement of said caliper in response to braking torque applied to the front wheel whereby said valve actuating means operated through the caliper support bracket and in turn actuates said valve means to close said main oil passage.

* * * * *